US 6,546,483 B1

(12) United States Patent
Lai

(10) Patent No.: US 6,546,483 B1
(45) Date of Patent: Apr. 8, 2003

(54) METHOD AND APPARATUS FOR CONFIGURING A DEVICE ASSIGNED TO A FIXED ADDRESS SPACE

(75) Inventor: Arthur Lai, Scarborough (CA)

(73) Assignee: ATI International Business SRL, Barbados (KN)

( * ) Notice: Subject to any disclaimer, the term of this patent is extended or adjusted under 35 U.S.C. 154(b) by 0 days.

(21) Appl. No.: 09/506,782

(22) Filed: Feb. 18, 2000

(51) Int. Cl.$^7$ .................................. G05F 15/177
(52) U.S. Cl. ............................... 713/1; 710/10
(58) Field of Search ........................ 713/1, 2, 100; 710/8, 10, 104

(56) References Cited

U.S. PATENT DOCUMENTS

| | | | | |
|---|---|---|---|---|
| 5,909,592 | A | * | 6/1999 | Shipman ............... 710/10 |
| 6,233,638 | B1 | * | 5/2001 | Porterfield ............ 710/129 |
| 6,308,234 | B1 | * | 10/2001 | Davies et al. .......... 710/104 |
| 6,353,885 | B1 | * | 3/2002 | Herzi et al. ............ 713/1 |
| 6,367,007 | B1 | * | 4/2002 | Do ..................... 713/2 |
| 2002/0019924 | A1 | * | 2/2002 | Davies et al. .......... 712/1 |

OTHER PUBLICATIONS

PCI Local Bus publication, Chapter 6, "Configuration Space", pp. 185–218 (1998).

* cited by examiner

Primary Examiner—Thomas M. Heckler
(74) Attorney, Agent, or Firm—Vedder, Price, Kaufman & Kammholz

(57) ABSTRACT

A device configuration method and apparatus initializes a device such as at least one graphics processor, by detecting whether the at least one graphics processor requires a dedicated address space. If the device requires a dedicated address space, boot up code, such as the system bios, maps the dedicated address space to another address space prior to running of an operating system. This is done based on, for example, using at least one subclass code bit in a class code register in configuration space memory as both a device function identifier and as control data to control mapping of the dedicated address space to another address space. The method and apparatus provides a type of universal method and apparatus for relocating or disabling, for example, VGA resources, through PCI registers or other suitable registers while maintaining legacy processing for graphics and video applications.

11 Claims, 3 Drawing Sheets

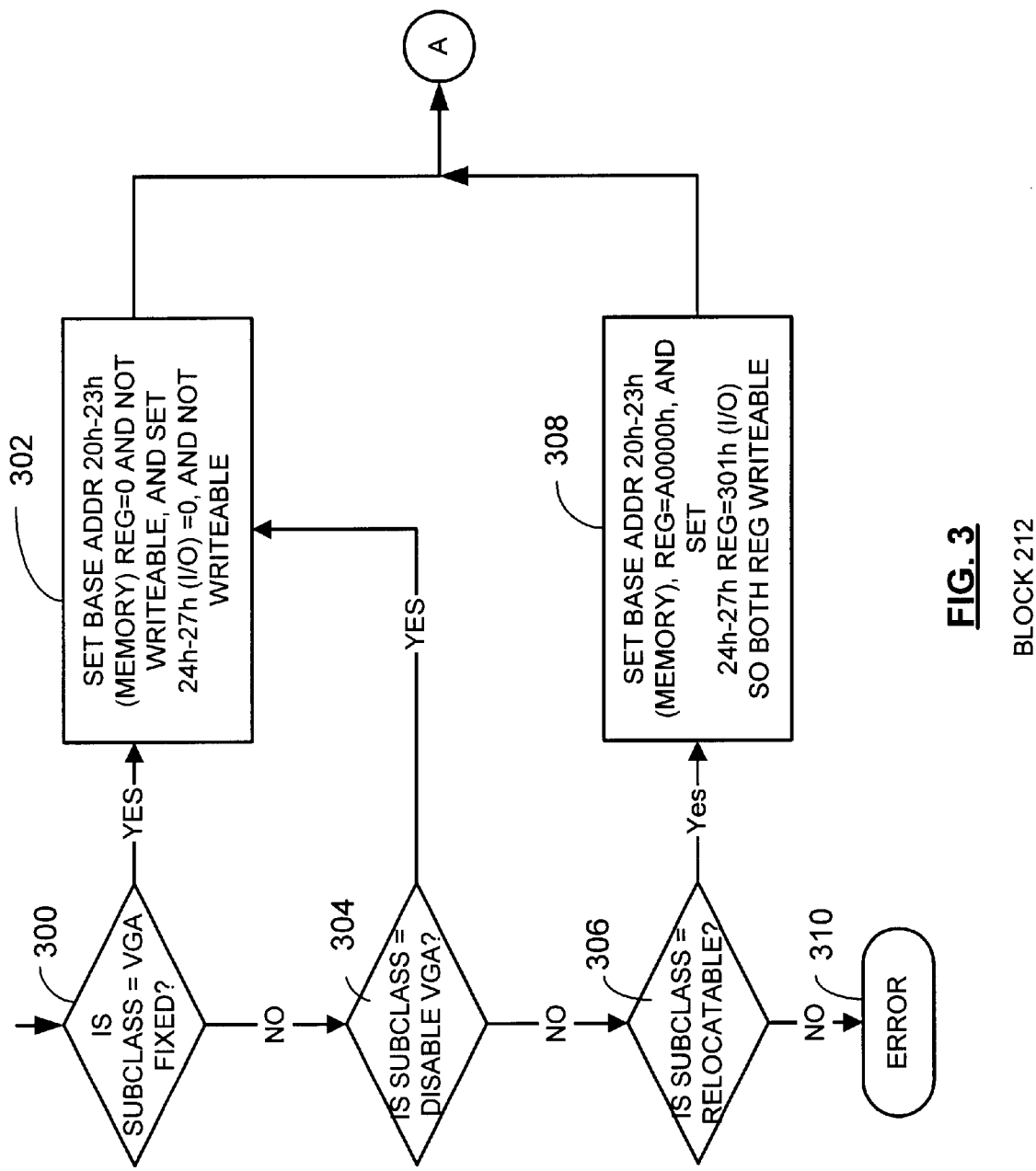

METHOD AND APPARATUS FOR CONFIGURING A DEVICE ASSIGNED TO A FIXED ADDRESS SPACE

FIELD OF THE INVENTION

The invention relates generally to methods and apparatus for initializing devices, and more particularly to methods and apparatus for configuring, through a system bios or other boot up code, a device that is initially assigned to a dedicated address space.

BACKGROUND OF THE INVENTION

Operating systems typically use system bios to initialize peripheral devices such as graphics processors and other peripheral devices. Some processing systems require that certain peripheral devices be assigned fixed address space by the operating system. These resources include, for example, I/O address space and memory address space. Because the address space is fixed, typically only one peripheral device assigned to that address space can be initialized even though multiple members of the same device can be installed since at any one time only one peripheral device can be assigned to the fixed address space. For example, as described in an Intel processor based computer system, a VGA graphics controller is assigned to a fixed address space. For all PCI compliant devices, the implementation of PCI Configuration Space is a must requirement. The PCI configuration space has 256 bytes and its registers has a specific record structure. One type of configuration space layout is described, for example, in Chapter 6 of PCI Local Bus publication, pp. 185–218 (1998).

As known in the art, VGA graphics controllers typically require the following resources: I/O addresses: 3B4h, 3B5h, 3BAh, 3C0H, 3C1h, 3C2h, 3C3H, 3C4h, 3C5h, 3CEh, 3CFh, 3D4h, 3D5h, 3DAh; memory location: 128K bytes at 0A0000h-0BFFFFh and ROM location: typically below 1 megabyte in a range of 0C0000h-CFFFFh but can be located anywhere in memory depending on implementation. For PCI devices, there is a subclass code (0Ah) in the PCI configuration space. The subclass code is a read only register and it identifies the type of device installed in the system. For VGA graphics controllers, the class code (0Bh) is 3 and the subclass code is 00000h. For a graphics controller with the VGA resources disabled, the subclass code is 080h. The class code register contains the subclass code bit containing the information bit register which contains bits representing, for example, a function of the peripheral device and type of peripheral device. If the VGA graphics class code is 3 and the subclass code is 0, the graphics processor indicates that its requires the I/O addresses and memory location described above. These address locations are fixed and cannot be changed through the class code register or the subclass code bit.

In the PCI configuration space, the class code register indicates if the installed device is a VGA graphics processor. This information is typically examined by the system bios by reading the configuration space registers as provided by the peripheral device. With multiple VGA graphics controllers installed in a system, only one set of VGA address space can be assigned to any one of the VGA controller. All the other VGA controllers have to be disabled by the system bios through the PCI configuration space because only one VGA address space can be provided by the system. Accordingly, if there are multiple VGA controller is installed in the system, only one VGA controller gets initialized and is booted up. The initialization of the secondary VGA controller has to be initialized by an application driver after the operating system is fully operational. Accordingly, different application drivers must be written for different operating systems. The initialization includes the programming of the graphics controller as a whole to a specific state and to disable the VGA processor portion of the graphics controller in order to avoid any resource conflict. The mechanism in which the secondary VGA controller is disabled is proprietary as is different for different hardware manufacturers. This can create unnecessary expenses since the application driver would have to typically be updated whenever hardware requires a different setting. As a result, the system bios only enables one VGA processor although two or more may be desired. In addition, older video programs may use VGA processing and it is desirable to accommodate these older technology processing capabilities to allow a system user to run older programs. However, a problem arises when multiple VGA processors are desired in a common system due to their fixed address space requirements.

Accordingly, a need exists for a method and apparatus for configuring a device that requires dedicated address space to allow the relocation of the dedicated resources or disabling the legacy portion of the device through, for example, PCI configuration registers while maintaining compatibility with legacy requirements. This method is universal to all VGA controllers and no proprietary programming is required for all VGA controller manufacturers.

BRIEF DESCRIPTION OF THE DRAWINGS

The invention will be more readily understood with reference to the following drawings wherein:

FIG. 2 is a flow chart illustrating one example of a method for configuring a device in accordance with one embodiment of the invention and FIG. 3 is a flowchart illustrating a system by the device being configured as pursuant to block 212 of FIG. 2.

DETAILED DESCRIPTION OF A PREFERRED EMBODIMENT OF THE INVENTION

Briefly, a device configuration method and apparatus initializes a device such as at least one graphics processor, by detecting whether the at least one graphics processor requires a dedicated address space. If the device requires a dedicated address space, boot up code, such as the system bios, maps the dedicated address space to another address space prior to running of an operating system. This is done based on, for example, using at least one subclass code bit in a class code register in configuration space memory as both a device function identifier and as control data to control mapping of the dedicated address space to another address space.

The method and apparatus provides a type of universal method and apparatus for relocating or disabling, for example, VGA resources, through PCI registers or other suitable registers while maintaining legacy processing for graphics and video applications.

Figure 1:
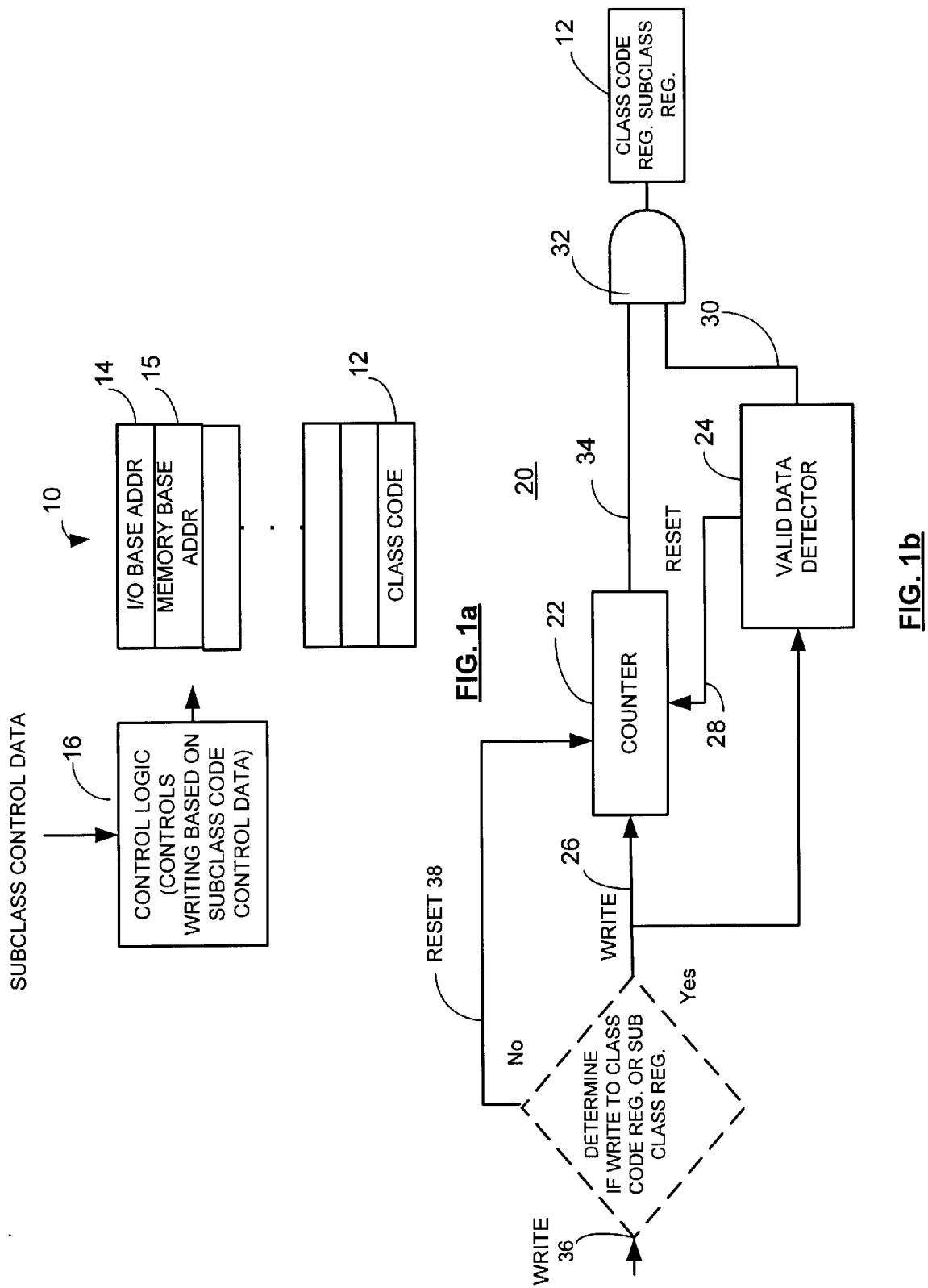
FIG. 1a is block diagram illustrating one embodiment of the configuration space memory and accompanying control logic according to one embodiment of the invention.
FIG. 1b is a block diagram illustrating a subclass code bit modifier in accordance with one embodiment of the invention.

FIG. 1a illustrates the configuration space memory 10 that contains a class code register 12 which contains a subclass code bit or bits. As further described below, the class code register can also contain data representing whether a dedicated address space device, such as a VGA processor is relocatable to another address space. The configuration space memory 10 also includes I/O base address registers 14 and memory base registers 15 that are writeable by the video processor to allow another address location other than the dedicated address space locations to be written by the graphics processor during initialization.

Control logic 16 is operatively coupled to the configuration space memory 10 and operative to reconfigure the I/O base address register 14 and the memory base register 15 in response to whether the class code register 12 contains the data representing that the dedicated address space device is relocatable. In one embodiment, a subclass code bit(s) is rewritten and used as control data to control the graphics processor to write other addresses locations as the new I/O base addresses to facilitate mapping of the base addresses of the VGA processor to non-dedicated memory location. If the system bios determines that the new memory locations have already been assigned to another device, the system bios then assigns other base address locations to the VGA processor. The control logic 16 may be hardware, software, firmware or any suitable combination thereof.

FIG. 1b shows one example of a subclass code bit modifier 20 that includes a counter 22, a valid data detector 24 and the class code register 12 with one or more subclass bits. The subclass code bit modifier 20 may be suitably implemented as software, hardware, firmware or any suitable combination thereof. The subclass code bit modifier 20 is part of the control logic 16. As shown, the counter 22 receives multiple consecutive writes 26 to the class code register. The multiple consecutive writes 26 are written by the system bios to change the subclass code bits in class code register 12 to serve as control data. At least one subclass code bit is used for control data. However, it will be recognized that any suitable number of subclass code bits may also be used. The valid data detector 24 is also operatively coupled to detect whether the multiple consecutive writes 26 are valid writes. The valid data detector 24 generates reset 28 for the counter 22 when the write command 26 is not valid. However, if the write command is valid, the valid data detector 24 outputs the valid write command 30 to an AND operation 32. The counter 22 may be set, for example, to count four consecutive writes to the class code register. If the counter 22 counts all four writes, the counter 22 outputs an enable signal 34 to enable the write command 30 to modify the subclass code bit in the class code register 12. In addition, any read or write 36 to other PCI configuration registers in between the consecutive write to the class code will cause reset 38 to reset the counter 22 as shown by the dashed diamond.

The class code register 12 is operatively responsive to the write command 30 to change the subclass code bits from information bits to address mapping control bits in response to detecting the proper number of consecutive writes and in response to the consecutive writes being valid. If the address mapping control bit changes, the control logic writes a non-dedicated I/O base address to the I/O base register 14 in the configuration space memory to map the device to another I/O address space and writes a non-dedicated memory base address to memory base register 15 in the configuration space memory to map the device to another memory address space. Accordingly, the dedicated address space is effectively overwritten when the subclass code bit is changed by the operating bios.

Figure 2:
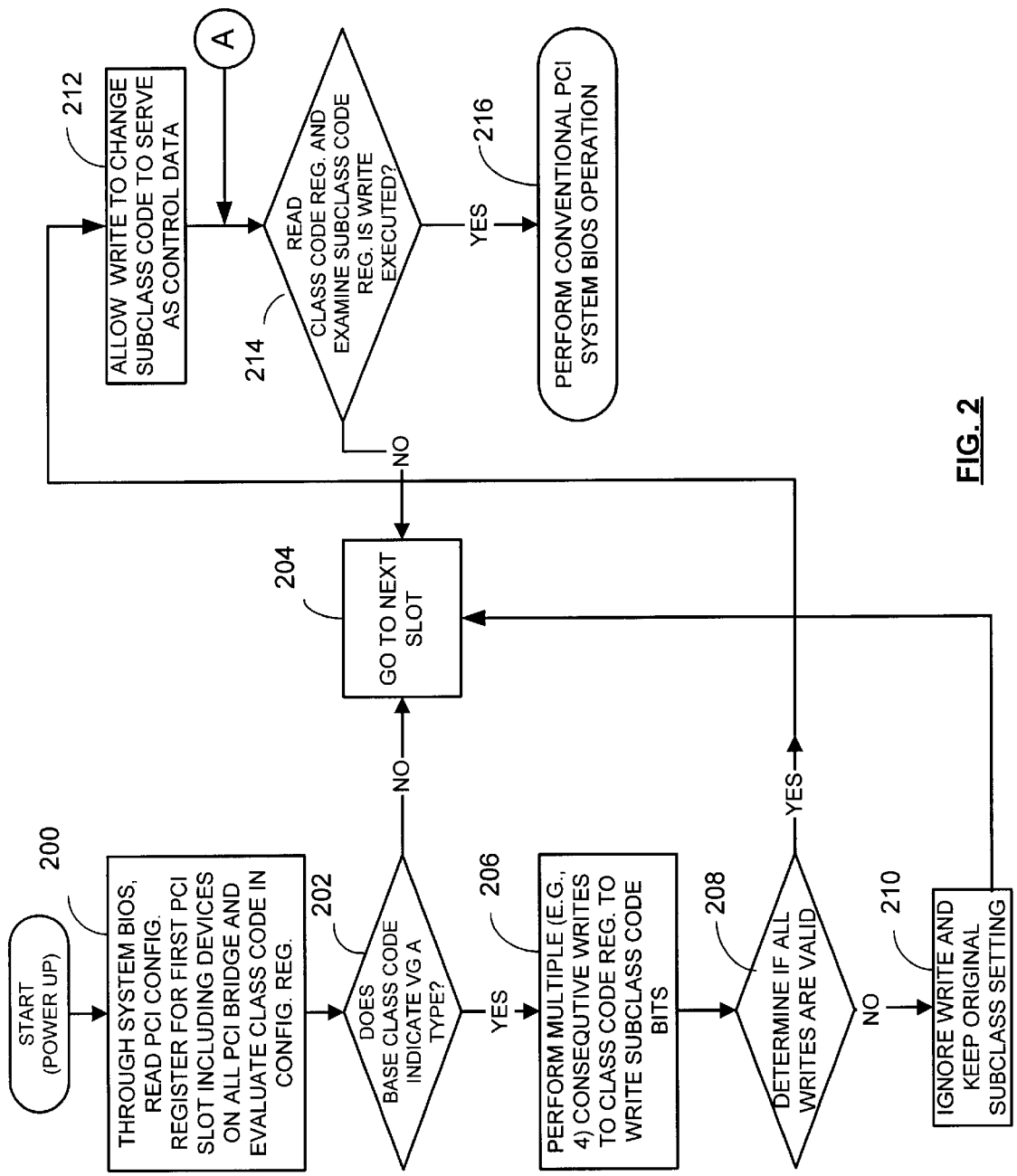

Referring also to FIG. 2, a method for configuring a peripheral device, through a system bios and video bios, will be described with reference to FIGS. 1a and 1b. The method includes determining through the system bios what device is in a slot, such as whether the device is a VGA processor that uses a dedicated address space. This may be determined as shown in block 200 by reading, for example, PCI configuration registers for the first PCI slot and evaluate the class code stored in the configuration register. The method also includes mapping, by the system bios, the device from a dedicated address space to another address space prior to running an operating system. However, prior to mapping, the process, as shown in block 202, includes determining whether the base class code indicates that the peripheral device is a VGA-type processor. If not, the system bios then goes to the next peripheral slot to obtain the configuration space memory from the peripheral's bios to again determine the class code of the new device as shown in block 204.

If, however, the class code indicates that the device is a VGA type, the method includes, as shown in block 206, performing multiple consecutive writes to the class code register to overwrite the subclass code bit or bits. This is done under control of the system bios. Accordingly, the system bios performs multiple consecutive writes 26 to a register, such as class code register 12, or any other suitable register, including any other register that initially identifies a function of the device to a system bios. The multiple consecutive writes are performed to effect a change in content of the class code register, namely to change the content of the subclass code bit.

As shown in block 208. The process includes determining if all writes are valid such as may be done by the valid data detector 24. If all the writes by the system bios are not valid, the process proceeds as shown in block 210, to ignore the write commands and keep the original subclass setting that was originally provided by the graphics device. However, if it is determined that all of the consecutive writes are valid, the system uses the subclass code as a pathway to change the VGA controller behavior. For example, at powerup, with the device being a VGA controller, the initial subclass code is set to zero as required, for example, by the PCI bus specification. However, when there are four consecutive writes to a subclass code register with the same valid subclass code value, the subclass code will change to the written value in the fourth write. Any read or write to other locations in a PCI configuration space memory or any such read of the subclass code between the consecutive write will reset the sequence. The reset is performed by the valid data detector sending the reset signal if invalid data is detected. Accordingly, the logic 20 only accepts correct values. Accordingly, if the system bios attempts to write an invalid pattern for the subclass code, the subclass code will not change and the behavior of the hardware will not change from its initial setting.

As shown in block 212, the graphics processor allows the write command 30 to change the subclass code to serve as control data. As shown in block 214, the system bios reads the class code register and examines the subclass code register bits to determine if the consecutive four writes actually resulted in an executed write command to change the subclass code bits. Accordingly, the change of the subclass code can be detected by reading it after the fourth write. With this mechanism, the system bios can determine if a new type of VGA controller is installed, namely one that allows memory address space relocation. As shown in block 216, the process includes performing conventional PCI system bios operations. For example, the system bios determines if a base address, such as non-dedicated base address, is written in response to changing of subclass code bits, and is in conflict with the previously allocated address. If a conflict is detected, the system bios maps the device to a new address.

Referring also to FIG. 3, the operation by the graphics processor of block 212 in FIG. 2 will be further explained. The graphics processor allows the write command represented by the four consecutive writes to change the subclass code bits to serve as control data. The graphics processor determines if the subclass bit has changed to determine if the VGA processor must maintain its fixed dedicated address space as shown in block 300. This is done, for example, by examining the subclass code bits. If the subclass code bits are set to zero, as shown in block 302, the process includes setting both the memory base register 14 and I/O base register 15 to zero and non-writable. The process then returns to block 214. As for the system bios, the class code and the non-writable of the registers 14 and 15 indicate that fixed VGA resources is required by the device.

However, if the control logic, upon examining the subclass code bit or bits from the class code register after reconfiguration write command has been allowed, indicates that the graphics processor does not require a fixed VGA address space, the process continues as shown in block 304 to determine if the subclass code bits indicate that the VGA portion of the graphics processor must be disabled. For example, this may be determined by looking at the subclass code bits that now serve as the control bits to see if the bits corresponds to a value indicating the disabling of the VGA processor, such as 80h. If so, the process includes setting both the memory base register 14 and I/O base register 15 to zero and non-writable. The process then returns to block 214. As for the system bios, the class code and the non-writable of the registers 14 and 15 indicate no VGA resources is required by the device.

As shown in block 306, if the subclass code bit positions which now serve as the data serving as control bit information, does not indicate that the VGA processor requires the dedicated address space and that the VGA processor must be disabled, the process includes using the changed content of the register as control data since the subclass control bits indicate that the VGA processor is relocatable. For example, the process includes determining whether the control bit defines that the device is relocatable to other address space. This may be done, for example, if the subclass code, for example, is set to 002h which designates that the VGA controller is relocatable. As shown in block 308, if the control data defines the device as being relocatable, the method includes using the changed content of the register, namely the updated or modified subclass control bits, as control data and writing a non-dedicated base address to the base address register to map the device to another address space. For example, the graphics process overwrites the I/O base address to set it the registers 24h–27h equal to 301h and effect the I/O base register 14 to a writable condition. In addition, the memory base register 15 is overwritten to be set to address location 0A0000h and base address 20h–23h. The memory base address register is also set to be writable. The process then continues to block 214 as indicated. As for the system bios, the class code and the writable of the registers 14 and 15 indicate that relocatable VGA resources is required by the device. Accordingly, the system bios then takes over to determine if the non-dedicated base address is in conflict with a previously allocated address. If so, the system bios then maps the non dedicated base address to get another new address.

Accordingly, if the subclass code bit (or bits) is changed to indicate that the VGA device is relocatable, the PCI registers 20h–23h are used to request the memory resource and PCI registers 24h–27h are used to request the I/O resources. Accordingly, compatibility is maintained with legacy systems since multiple VGA processors may be initialized through the system bios and may be designated as relocatable to non-dedicated address resources. In one embodiment, the subclass code bit or bits are used to effect the changing of the dedicated address space to different address space. The system bios communicates to the VGA device through subclass code bits and uses the subclass code bits as both information bits and also as control bits to reconfigure the device. The reconfiguration of the address change is done through PCI configuration registers or other suitable configuration registers.

It should be understood that the implementation of other variations and modifications of the invention in its various aspects will be apparent to those of ordinary skill in the art, and that the invention is not limited by the specific embodiments described. As used herein, system bios includes any boot up code for a device. It is therefore contemplated to cover by the present invention, any and all modifications, variations, or equivalents that fall within the spirit and scope of the basic underlying principles disclosed and claimed herein.

What is claimed is:

1. A method for configuring, through a system bios, a device comprising the steps of:
    determining, through the system bios, whether the device uses a dedicated address space; and
    mapping, by the system bios, the dedicated address space to another address space prior to running an operating system.

2. The method of claim 1 wherein the step of mapping the dedicated address space to another address space prior to running an operating system includes using at least one configuration register.

3. The method of claim 1 including the steps of:
    performing multiple consecutive writes, under control of the system bios, to a register initially identifying a function of the device to effect a change in content of the register;
    using the changed content of the register as control data and writing a non-dedicated base address to a base address register to map the dedicated address space to another address space; and
    determining if the non-dedicated base address is in conflict with a previously allocated address and if so, mapping to a new address.

4. The method of claim 3 including the step of determining whether the control data defines the device as being relocatable to other another address space and if so, determining whether the another base address for the device is in conflict with a previously allocated address.

5. A method for configuring at least one graphics processor through a system bios comprising the steps of:
    determining, through a system bios operation, whether a graphics processor includes a VGA controller; and
    mapping a dedicated address space of the VGA controller to another address space using at least one PCI configuration register.

6. The method of claim 5 wherein the step of mapping the dedicated address space of the VGA controller to another address space includes using at least one subclass code bit in a class code register in a configuration space as both a device function identifier and as control data to control mapping of the dedicated address space to another address space.

7. The method of claim 5 including the steps of:
    performing multiple consecutive writes, under control of the system bios, to a class code register to write subclass code bits;

determining if the multiple consecutive writes are valid and if so, allowing the writes to change subclass code bits to serve as control data;

writing, by the graphics processor, a non-dedicated base address to a base address register in the configuration space to map the dedicated address space to another address space;

reading, by the system bios, the subclass code bits to determine if the consecutive writing was executed; and determining, by the system bios, if the non-dedicated base address is in conflict with a previously allocated address and if so, mapping to a new address.

8. The method of claim 7 including the step of determining whether the control data defines the device as being relocatable to other another address space and if so, determining whether a base address for the device another base address for the device is in conflict with a previously allocated address.

9. The method of claim 6 including the step of controlling the graphics processor based on the at least one subclass code bit, to set base addresses for at least one of an I/O address and memory address for the graphics processor.

10. A device configuration apparatus comprising:

configuration space memory including a class code register containing data representing whether a dedicated address space device is relocatable to another address space through an I/O base address register and a memory base address register; and control logic operatively coupled to the configuration space memory operative to reconfigure the I/O base address register and the memory base address register in response to whether the class code register contains the data representing that the dedicated address space device is relocatable.

11. The apparatus of claim 10 including a subclass code bit modifier including:

a counter operative to count multiple consecutive writes to the class code register to change subclass code bits to serve as control data;

a valid data detector operative to detect whether the multiple consecutive writes are valid and operative to reset the counter;

the class code register operatively coupled to receive a write to change subclass code bits to address mapping control bits in response to detection of a proper number of consecutive writes and in response to the consecutive writes being valid, and wherein the control logic writes a non-dedicated base address to the I/O base address register in the configuration space to map the device to another address space.

* * * * *